United States Patent [19]

Kraaij et al.

[11] Patent Number: 4,887,004
[45] Date of Patent: Dec. 12, 1989

[54] EMERGENCY LIGHTING SYSTEM

[75] Inventors: Wouter Kraaij, Someren-eind; Meindert Visser, Valkenswaard, both of Netherlands

[73] Assignee: Fano International Limited, Gibralter, United Kingdom

[21] Appl. No.: 115,169

[22] Filed: Oct. 30, 1987

[30] Foreign Application Priority Data

Oct. 31, 1986 [GB] United Kingdom ............... 8626132

[51] Int. Cl.$^4$ ........................................... H05B 41/14
[52] U.S. Cl. ............................... 315/86; 315/DIG. 5
[58] Field of Search ...................... 315/86, 209 R, 219, 315/220, 246, DIG. 5, DIG. 7

[56] References Cited

U.S. PATENT DOCUMENTS 4,029,993  6/1977  Alley et al. .................. 315/219

Primary Examiner—Robert L. Griffin
Assistant Examiner—T. Salindong
Attorney, Agent, or Firm—Edwin D. Schindler

[57] ABSTRACT

An emergency lighting unit comprises a battery-powered converter circuit for maintaining a discharge in a gas discharge or fluorescent light, the converter circuit also being arranged to generate a high voltage for striking the discharge in the light. When the mains supply is good and a switch is closed for turning on the light, the converter circuit is activated to provide its high voltage for striking the discharge, after which the discharge is maintained from the mains supply. If the mains should then fail, the converter circuit provides its low voltage from its battery to maintain the discharge. If the mains fails while the light is switched off, the converter circuit strikes and then maintains the discharge in the light.

4 Claims, 1 Drawing Sheet

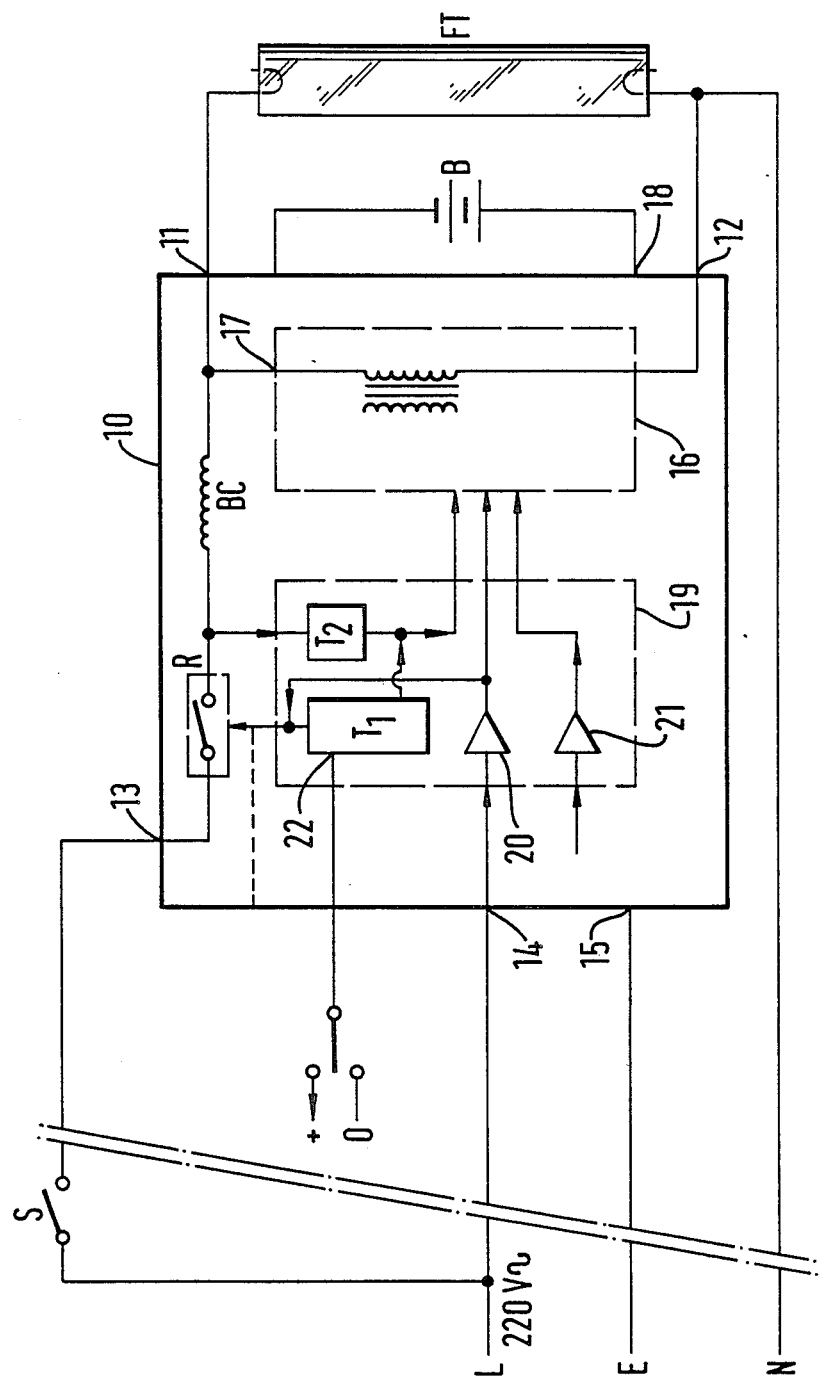

EMERGENCY LIGHTING SYSTEM

This invention relates to a unit for use with gas discharge or flourescent lights in order to provide for an emergency lighting in the event that the mains supply should fail.

Flourescent lights are used widely in numerous applications but in some applications (e.g. large warehouses) there is a requirement to provide an emergency lighting system which will maintain a level of illumination for a period of time after any failure in the mains supply. Hitherto this has meant that a separate emergency lighting system has had to be installed.

We have now devised a unit for installation with gas discharge or flourescent lights and serving for the flourescent lights themselves to provide an emergency lighting in the event of any failure in the mains supply.

In accordance with this invention, there is provided an emergency lighting unit, comprising a battery-powered converter circuit for maintaining a discharge in a gas discharge or flourescent light, which converter circuit is also arranged to generate a high voltage for striking the discharge in the light.

Thus in this unit, the converter circuit is capable of generating a high voltage from the battery for striking the flourescent light or tube. Preferably it is arranged to maintain this high voltage for about 4 seconds, after which it returns to a low voltage output in order to maintain the discharge if the mains supply has failed. Preferably the converter circuit also serves to strike the tube even if the mains supply is intact, by generating its high voltage from the battery, after which the discharge is maintained from the mains supply.

A preferred embodiment of emergency lighting unit includes a comparator for determining when the mains voltage has dropped below or risen above a threshold value, in order to switch on or off the converter circuit for providing current from the battery in order to maintain the discharge with the tube. Preferably another comparator is provided to respond if the battery voltage falls below a threshold in order to disable the converter circuit and prevent deep discharge of the battery. The battery may be rechargeable in which case the unit preferably comprises means for recharging the battery from the mains supply.

The preferred embodiment of emergency lighting unit also includes a self-test arrangement which may be initiated remotely and serves to test that the unit is capable of striking or maintaining a discharge in the tube should the mains supply fail.

An embodiment of this invention will now be described by way of example only and with reference to the accompanying drawing, the single FIGURE of which is a schematic block diagram of the circuitry of an emergency lighting system.

Referring to the drawing, an emergency lighting unit 10 has output terminals 11, 12 for connection across a flourescent light or tube FT, terminal 12 being connected to the mains neutral N. The unit is powered from a battery or battery pack B, the or each battery being for example of sealed lead acid or rechargeable nickle cadmium types. An input terminal for the mains line L (via an on/off switch S) is provided on the unit, also a terminal 14 for connecting to line L for monitoring the mains voltage and for charging the battery or batteries B and a ground terminal 15 are provided.

Within the unit, a converter circuit 16 has output terminals 17, 18 connected to the output terminals 11, 12 of the unit and serves to generate appropriate voltages (from the battery or batteries B) for application to the tube FT, as will be described below. The mains supply line L is connected to the output terminal 11 of the unit via relay contacts R and a ballast coil BC which are provided in series in each other within the unit.

A control circuit 19 of the unit controls the converter circuit 16 and the relay R. This control circuit comprises a first comparator 20 having an input from the terminal 14 of the unit and serving to determine when the mains supply voltage falls below or rises above a threshold. The control circuit also comprises a second comparator 21 which determines when the voltage of the battery or battery pack B falls below a threshold. The outputs of the two comparators are connected as a control input to the converter circuit 16. A timer $T_1$ has a testing input for purposes which will described below and a timer $T_2$ has an input from the mains downstream of the relay R: timers $T_1$ and $T_2$ have outputs also connected to the converter circuit 16.

In use of the lighting unit, suppose firstly that the mains supply a good and switch S is operated in the usual way for turning on the light. Relay contacts R are normally closed and timer $T_2$ is triggered to turn on the converter circuit 16 for 4 seconds, during which it generates a high voltage output from the battery B to strike the tube FT. At the end of the 4 second periods of timer $T_2$, the converter is switched off and the mains supply continues to drive the tube FT through the ballast BC.

Should comparator 20 detect that the mains supply has dropped below the threshold voltage, it serves to turn on the converter circuit 16 for the latter to generate a low level voltage from the battery B, sufficient to maintain a discharge in the tube FT, and also to switch off relay R.

If whilst the light is switched off the mains supply fails or falls below the threshold, then firstly the converter circuit 16 generates a high voltage output for 4 seconds from the battery B, to fully strike the tube FT. After this time period, the converter circuit 16 reduces its output to a low voltage level sufficient to maintain the discharge in the tube FT. If the voltage of the battery B drops below the threshold set by the comparator 21, then the converter circuit will be switched off altogether in order to prevent deep discharge of the battery or batteries. Preferably the converter circuit includes an arrangement for recharging the battery or batteries from the mains when this is good.

The timer $T_1$ serves for testing the unit as follows. When the test input 22 is connected momentarily to a low voltage as shown, this serves to open relay contacts R and interrupt the mains supply, and activate timer $T_1$ so that after a period the converter circuit 16 is turned on for it firstly to generate its high voltage to strike the tube FT, and then to drop to a low voltage for maintaining the tube. The unit will stay in this self-test mode until either the battery B is exhausted (and the converter is turned off via comparator 21) or the test input 22 is taken momentarily to high voltage.

The testing arrangement may be initiated using any one of a number of appropriate means, e.g. a local switch, a remote infra-red or acoustic hand-held unit, or R.F. interrogation through the air or over the mains. The input 22 may be paralleled to the similar inputs of other units allowing for multiple testing to be carried out.

The unit which has been described is therefore capable of providing for emergency lighting of the fluorescent tube and also serves to strike the tube (when the mains supply is good) without a separate starting switch being required.

What is claimed is:

1. An emergency lighting system, comprising:
electrical battery means;
a converter circuit powered by said electrical battery means;
a lighting unit comprising a gas discharge light connected to said converter circuit, circuit means for connecting said gas discharge light to an electrical mains supply and including a switch for turning on the light from the mains;
means for detecting low mains voltage so that when said gas discharge light is off, said converter circuit is activated in order to generate a high voltage from said electrical battery means for striking a discharge in said light;
means for activating said converter circuit to provide a low voltage from said electrical battery means for maintaining the discharge in said light once the discharge has been struck;
means responsive to said switch if the mains supply is of operable mains voltage for activating the converter circuit to generate its high voltage from the battery means to strike a discharge in said light; and,
means for maintaining the discharge from the mains supply after it has been struck.

2. The emergency lighting system according to claim 1, further comprising means for detecting low mains voltage when the discharge is being maintained from the mains, in order to activate said converter circuit for providing a low voltage from said electrical battery means in order to maintain said discharge, without first causing said converter circuit to generate its high voltage.

3. The emergency lighting system according to claim 1, further comprising means for detecting low battery voltage to disable said converter circuit and prevent deep discharge of said electrical battery means.

4. The electrical lighting system according to claim 1, further comprising a self-testing means operable to isolate said light from the mains supply and then activate said converter circuit to generate its high voltage to strike a discharge in the light and then provide its low voltage from maintaining the discharge.

* * * * *